United States Patent
Tiefenthal et al.

[15] 3,674,879
[45] July 4, 1972

[54] PROCESS FOR PREPARING CHLORO-SUBSTITUTED BIS(HYDROXYPHENYL)METHANES

[72] Inventors: Harlan E. Tiefenthal, Western Springs; Eric Jungermann, Chicago; Eugene J. Miller, Jr., Wheaton; John J. Callahan, Park Ridge, all of Ill.

[73] Assignee: Armour Industrial Chemical Company, Chicago, Ill.

[22] Filed: April 24, 1968

[21] Appl. No.: 723,893

Related U.S. Application Data

[63] Continuation-in-part of Ser. No. 492,293, Oct. 1, 1965, abandoned.

[52] U.S. Cl. ........................................................260/619 A
[51] Int. Cl. .................................C07c 37/00, C07c 39/16
[58] Field of Search ............................................260/619 A

[56] References Cited

UNITED STATES PATENTS

| | | | |
|---|---|---|---|
| 2,775,620 | 12/1956 | Williamson | 260/619 X |
| 3,057,928 | 10/1962 | Koblitz et al. | 260/619 X |

*Primary Examiner*—Bernard Helfin
*Assistant Examiner*—Norman Morgenstern
*Attorney*—Carl C. Batz and Francis W. Young

[57] ABSTRACT

A process for preparing chloro-substituted bis (hydroxyphenyl)methanes by reacting a formaldehyde yielding substance with chloro-substituted phenol is the presence of hydrogen fluoride. Such chloro-substituted bis(hydroxyphenyl) methanes are useful as bactericides.

16 Claims, No Drawings

PROCESS FOR PREPARING CHLORO-SUBSTITUTED BIS(HYDROXYPHENYL)METHANES

CROSS-REFERENCE TO RELATED APPLICATION

This application is a Continuation-In-Part of our copending application Ser. No. 492,293, filed Oct. 1, 1965, now abandoned.

Chloro-substituted bis(hydroxyphenyl)methanes exhibit properties of great interest to the pharmaceutical, cosmetic, and soap industries. It is known that chloro-substitutions increase the microbicidal potency of phenol derivatives. As a representative example, bis(3,5,6-trichloro-2-hydroxyphenyl) methane, commonly called hexachlorophene, is known to exhibit marked anti-bacterial action, especially against gram-positive organisms. This characteristic renders the chemical useful as a bacteriostatic and bactericidal agent. Hexachlorophene is extensively used as a soap additive and is also used in compositions such as cosmetic deodorants and creams and toothpastes.

One known process for preparing hexachlorophene, described in U. S. Pat. No. 2,250,480, utilizes the condensation of 2,4,5-trichlorophenol with formaldehyde in the presence of sulfuric acid and an alcohol solvent. In the described process the sulfuric acid condensation agent is lost either in the form of alkali metal sulfates or in the form of acid solutions too dilute to be of commercial use. It is economically impractical to attempt the extensive processing necessary to recover commercially usable acid therefrom and the dilute acid solutions, furthermore, present a water disposal problem. Further, the process described in this patent requires expensive cooling equipment to obtain the required low reaction temperatures of about 0° to 5° C. Moreover, this condensation process requires about 24 hours reaction time.

U. S. Pat. No. 2,435,593 describes a process for preparing hexachlorophene by condensing 2,4,5-trichlorophenol with a formaldehyde-yielding substance at elevated temperatures (up to 150° C.) in the presence of a minor amount of concentrated sulfuric acid or oleum. Again, the process of this patent does not permit practical recovery of the condensation agent. It also utilizes an elevated reaction temperature of at least 65° C.

U. S. Pat. No. 2,812,365 describes an improved process for preparing hexachlorophene by condensing 2,4,5-trichlorophenol with a formaldehyde-yielding substance at elevated temperatures (50° C. to about 100° C.) in the presence of concentrated sulfuric acid or oleum, and at least one solvent from the group of perchloroethylene, chloroform, carbon tetrachloride, and unsaturated polyhalogenated derivatives of ethane and propane, such as ethylene dichloride, trichloroethane, tetrachloroethane, 1,2-dichloropropane and ethylene dibromide.

We have discovered a process wherein formaldehyde, which may be obtained from formaldehyde yielding substances, may be reacted with phenol solely chloro-substituted in the presence of greater than catalytic quantities of hydrogen fluoride to result in nearly quantitative yields of chloro-substituted bis(hydroxyphenyl)methanes. In our process, hydrogen fluoride is used both as a solvent and as a condensing agent. The hydrogen fluoride utilized in our process may be readily recovered, rendering the process particularly adaptable to plant-scale operation.

A specific embodiment of our invention may be exemplified by the following chemical equation for preparing hexachlorophene:

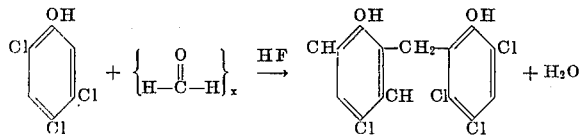

wherein X represents a stoichiometric amount of formaldehyde-yielding substance in relation to the amount of substituted phenol present. The water liberated in the reaction is absorbed by anhydrous hydrogen fluoride, thus driving the reaction to completion.

An object of our invention is to provide a highly efficient process for preparing chloro-substituted bis(hydroxyphenyl) methanes.

Another object of our invention is to provide a process for the preparation of chloro-substituted bis(hydroxyphenyl) methanes wherein the reaction catalyst is also utilized as the reaction solvent.

Still another object of our invention is to provide a process for the preparation of chloro-substituted bis(hydroxyphenyl) methanes wherein the reaction catalyst-solvent is readily recovered.

Still another object of our invention is to provide a process for preparing chloro-substituted bis(hydroxyphenyl) methanes at essentially room temperatures.

A further object of our invention is to prepare chloro-substituted bis(hydroxyphenyl) methanes within a substantially short reaction time.

Another object of our invention is to provide a highly efficient process for preparing hexachlorophene.

Other objects and advantages and a fuller understanding of our invention may be obtained by referring to the following description and examples.

Suitable formaldehyde-yielding substances, such as paraformaldehyde, or trioxane, or other formaldehyde-yielding substances known to those skilled in the art may be employed in our process. Paraformaldehyde has been found to be especially satisfactory in our process.

Chloro-substituted phenols useful in our process include those phenols having chloro substitutions in the order of mono-, di-, and tri- chloro. Especially useful chloro-substituted phenols include p-chlorophenol, 2,4-dichlorophenol, and 2,4,5-trichlorophenol.

The reaction of our process will proceed using different proportions of reactants. The reaction stoichiometry is satisfied when the mole ratio of formaldehyde-yielding substance to chloro-substituted phenol is at least 0.5 to 1.0. An amount of formaldehyde-yielding substance slightly more than the stoichiometric requirement is preferred. An excess of from about 2 to 10 mole percent of formaldehyde-yielding substance has been found to be especially satisfactory. Larger excesses are not desirable for economic reasons.

The amount of hydrogen fluoride employed in our process may vary over wide ranges. However, to derive the maximum benefits of our process, hydrogen fluoride should be present in greater than catalytic quantities. While the hydrogen fluoride has a catalytic effect, it also serves as a reaction medium and solvent. Using the mole ratio of hydrogen fluoride to substituted phenol of 1 to 1, the reaction does not appear to proceed to an appreciable extent. We prefer reaction conditions wherein liquid hydrogen fluoride is present in greater mole quantity than the substituted phenol. A mole ratio of hydrogen fluoride to chloro-substituted phenol of more than 5 to 1 is suitable; from about 20 to 1 to about 30 to 1 has been found especially satisfactory, although greater amounts of hydrogen fluoride may be used. Use of larger amounts of hydrogen fluoride is governed by economic considerations.

While many methods for bringing the reactants together may be utilized, a preferred sequence is to add the formaldehyde-yielding substance to the substituted phenol in hydrogen fluoride. The chloro-substituted phenol and the formaldehyde-yielding material may also be brought together in solid form and heated before the addition of hydrogen fluoride.

The process of our invention may be carried out over a wide range of temperatures. Temperatures from about 0° to 170° C. are suitable for the reaction. The preferred reaction temperature is from about 20° to 90° C.

The reaction is usually complete in from 3/4 to 1½ hours although with variant temperatures or pressures the reaction may be complete in from a matter of minutes to several hours.

The reaction will proceed under a wide range of pressure conditions. Pressures ranging from atmospheric to 20 atmospheres are particularly satisfactory. When the reaction occurs in a closed apparatus, raising the temperature generates an autogenous pressure, thus the operant pressure under these conditions depends upon the reaction temperature conditions.

The process of our invention may be conducted either batch-wise or continuously in any suitable apparatus; such as an autoclave made of or lined with corrosion resistant materials such as silver, cooper, Monel, synthetic polymers and the like.

The reaction product may be obtained by solvent extraction after the addition of the reaction mixture to water or by driving off the hydrogen fluoride from the reaction mixture with heat. The latter method is particularly suitable for plant-scale operations wherein the hydrogen fluoride may be readily recycled. Any suitable recovery methods known to the art may also be used. Further purification of the crude reaction product by methods well known to the art may be effected as required.

The process of our invention appears unexpectedly selective. As is well known in the art, substitution of chloro groups on the aromatic phenol nucleus inactivates the molecule, trichlorophenol being considerably less reactive than unsubstituted phenol. It is also well known in the art that substitution of methyl groups on phenol increases the reactivity of the molecule. Thus, the chloro-substituted phenol is a substantially different species with regard to reactivity than either phenol itself or the activated phenols, such as xylenols. The unexpected result of reaction of chloro-substituted phenol with formaldehyde is shown in the Examples to result in increased yield of chloro-substituted bis(hydroxyphenyl)methanes with increased chloro substitution. On the other hand, it is well known that formaldehyde reacts extremely actively with unsubstituted phenol to result in a resinous material.

Likewise, the process of our invention appears unexpectedly selective with respect to aldehydes. Acetaldehyde, having an electron donating methyl group attached to the aldehydic function, does not react to any appreciable extent under the conditions of our process with 2,4,5-trichlorophenol. On the other hand, trichloroacetaldehyde having the electron withdrawing trichloromethyl group attached to the aldehydic function does not react to an appreciable extent under the conditions of our reaction with 2,4-dichlorophenol. Trichlorophenol does not react to an appreciable extent under reaction with trichloroacetaldehyde, acetaldehyde or paraldehyde under the conditions of our process. Further, cellulose and 2,4,5-trichlorophenol reactants were subjected to the reaction conditions of our process at 50° C. for 3 hours and no identifiable aromatic condensation products were obtained - 92 percent of the 2,4,5-trichlorophenol reactant was recovered and the isolated product did not show any aromatic absorption by infrared analysis. Use of formaldehyde reactant under essentially the same conditions results in substantial yields of condensation product using both 2,4-dichlorophenol and 2,4,5-trichlorophenol.

Therefore, it appears that the reaction between chloro-substituted phenols and formaldehyde is quite selective when considering the individual reactants.

The following examples are presented to illustrate the present invention.

EXAMPLE I

To 100 grams (5.0 moles) of hydrogen fluoride in a 300 ml. Monel autoclave equipped with a stirrer and cooled below 0° C. was added, with stirring, 22.7 grams (0.177 mole) of p-chlorophenol, and then 2.9 grams of paraformaldehyde, approximately 95 percent active (0.092 mole formaldehyde equivalent). The autoclave was closed, the temperature was raised to 25° C. and maintained at 25° C. for 1½ hours. The autoclave was then cooled to below 0° C. and opened. The contents of the autoclave were then added to 1½ liters of water, salt was added to the saturation point and the mixture was extracted with two 700 ml. portions of ether. The ether extracts were washed with 10 250-ml. portions of saturated salt solution and dried over anhydrous magnesium sulfate. The ether was removed and the residue was steam distilled with toluene. 3.1 grams of p-chlorophenol were recovered from the toluene distillate. The insoluble material in the stillpot was filtered using 700 ml. of water, washed with water and dried to obtain a tan solid weighing 15.1 grams and having a melting point 137°-155° C. (Crude yield 63percent). Sublimation of the 63 solid twice at 0.5 mm, bath temperature 150° C., resulted in 4.47 grams (19 percent yield) of a white solid, melting point 179° C., which did not depress the melting point of authentic bis(5-chloro-2-hydroxyphenyl) methane (melting point 179° C).

EXAMPLE II

The procedure used in Example I was followed substituting 2,4-dichlorophenol for p-chlorophenol, and operating the reaction for 1½ hours at 70° C. The mole ratios of starting materials were the same as in Example I. Filtration of the insoluble material in the stillpot after steam distillation with toluene gave a brown solid having a melting point of 148°-160° C. (Crude yield 60 percent). Recrystallization resulted in a 35 percent yield of light buff needles of bis(3,5-dichloro-2-hydroxyphenyl) methane having a melting point of 167°-168.5° C. (Reported 168° C).

EXAMPLE III

The procedure used in Example I was followed to the solvent removal step substituting 2,4,5-trichlorophenol (97 percent active) for p-chlorophenol, and operating the reaction for 1½ hours at 70° C. The chemicals were combined, as in Example I, in a mole ration of 2,4,5-trichlorophenol to paraformaldehyde to hydrogen fluoride of 1.0 to 0.52 to 28.2. Solvent removal resulted in an off-white solid having a melting point of 161.5°-163.0° C. (Crude yield 97.4 percent). A small amount of unreacted trichlorophenol was distilled from this solid by heating at steam bath temperatures under high vacuum. An off-white solid (95 percent yield) having a melting point of 163.0°-164.5° C. was obtained. The melting point of a mixture of this product with bis(3,5,6-trichloro-2-hydroxyphenyl) methane was the same as the melting point of bis(3,5,6-trichloro-2-hydroxyphenyl) methane (melting point 163.0°-164.5° C.), An infrared spectrum showed that the product was bis(3,5,6-trichloro-2-hydroxyphenyl) methane and that it contained less than 0.1 percent 2,4,5-trichlorophenol.

EXAMPLE IV

Stoichiometric amounts of 2,4,5-trichlorophenol and paraformaldehyde were added to an autoclave containing liquid hydrogen fluoride in the amounts shown in Table I. After the reaction time of 1½ hours at 25° C. the reaction mixture was added to water. The crude product was extracted with a solvent and was isolated after solvent removal. Unreacted trichlorophenol was distilled from the crude product under high vacuum at steam bath temperatures to give the hexachlorophene product.

The maximum yield of bis(3,5,6-trichloro-2-hydroxyphenyl) methane (hexachlorophene) was determined by the amount of product after the removal of 2,4,5-trichlorophenol by distillation. In those instances of high product yield, the purity of the product as determined by its melting point, by its mixed melting point with standard hexachlorophene, and by comparison of its infrared spectrum with that of standard hexachlorophene shows that the actual yield of hexachlorophene is equal to the maximum yield shown in Table I. However, in those instances of low yield of product the purity of the product indicates that the actual yield of hexachlorophene is considerably lower than the maximum yield shown in Table I.

TABLE I

| Mole ratio 2,4,5-trichlorophenol CH$_2$O:HF | Percent crude yield | Percent 2,4,5-trichlorophenol in— | | Maximum percent yield of 100% active hexachlorophene (by distillation of 2,4,5-trichlorophenol) | Melting point, ° C. | |
|---|---|---|---|---|---|---|
| | | Crude (by distillation) | Product after distillation (by IR) | | Product | Product and standard hexachlorophene (163–164.5° C.) |
| 1.0:0.5:1.1 | 87 | 88.5 | | 8.3 | Semi-solid | |
| 1.0:0.5:7.05 | 96.5 | 38.4 | | 57.2 | 150–162 | 157–163 |
| 1.0:0.5:14.1 | 95.6 | 17.2 | | 77.8 | 163–164.5 | 163–164.5 |
| 1.0:0.5:28.2 | 94.8 | 7.4 | 0.35 | 86.5 | 163–164.5 | 163–164.5 |

EXAMPLE V

The procedure set forth in Example IV was followed, operating the reaction at 70° C. using molar ratios of chemicals as shown in Table II. Analyses were performed as in Example IV and the results are shown in Table II.

TABLE II

| Mole ratio 2,4,5-trichlorophenol CH$_2$O:HF | Percent crude yield | Percent 2,4,5-trichlorophenol in— | | Maximum percent yield of 100% active hexachlorophene (by distillation of 2,4,5-trichlorophenol) | Melting point, ° C. | |
|---|---|---|---|---|---|---|
| | | Crude (by distillation) | Product after distillation (by IR) | | Product | Product and standard hexachlorophene (163–164.5° C.) |
| 1.0:0.5:14.1 | 94.8 | 8.3 | | 86.0 | 162–164 | 162.5–164 |
| 1.0:0.5:28.2 | 97.5 | 2.6 | 0.1 | 95.1 | 163–164.5 | 163–164.5 |

EXAMPLE VI

The procedure used in Example IV was followed, using a molar ratio of 2,4,5-trichlorophenol to paraformaldehyde to anhydrous hydrogen fluoride of 1.0 to 0.5 to 28.2 and operating the reaction at both 25° and 70° C. for reaction times of ¾ hour, 1½ hours and 3 hours.

Analyses were performed as in Example IV and the results are shown in Table III.

TABLE III

| Time, hrs. | Temp., ° C. | Percent crude yield | Percent 2,4,5-trichlorophenol in crude (by dist.) | Maximum percent yield of 100% active hexachlorophene (by dist. of 2,4,5-trichlorophenol) | Melting point, ° C. | |
|---|---|---|---|---|---|---|
| | | | | | Product | Product and standard hexachlorophene |
| ¾ | 25 | 94.7 | 26.2 | 70 | 163–164.5 | 163–164.5 |
| 1½ | 25 | 94.8 | 7.4 | 86.5 | 163–164.5 | 163–164.5 |
| 3 | 25 | 96.6 | 10.6 | 86.4 | 163–164.5 | 163–164.5 |
| ¾ | 70 | 95.3 | 12.2 | 83.3 | 161–163 | 162–164 |
| 1½ | 70 | 97.5 | 2.6 | 95.0 | 163–164.5 | 163–164.5 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for preparing chloro-substituted bis(hydroxyphenyl) methanes comprising the steps of reacting formaldehyde with a phenol selected from the group consisting of p-chlorophenol, 2,4-dichlorophenol, and 2,4,5-trichlorophenol at a temperature of from about 0° to 170° C in the presence of liquid hydrogen fluoride, said hydrogen fluoride being present in greater mole quantity than said phenol and when said formaldehyde or phenol is present in excess of the stoichiometric requirement said excess being 10 mole percent and less.

2. The process of claim 1 wherein said formaldehyde is present in excess of the stoichiometric requirement.

3. The process of claim 1 wherein said formaldehyde is present in from 2 to 10 mole percent in excess of the stoichiometric requirement.

4. The process of claim 1 wherein said formaldehyde is present in approximately the stoichiometric requirement.

5. The process of claim 1 wherein said hydrogen fluoride is present in greater mole quantities than said phenol by a ratio of at least 5 to 1.

6. The process of claim 5 wherein said hydrogen fluoride is present in greater mole quantities than said phenol by a ratio of at least 20 to 1 to about 30 to 1.

7. The process of claim 5 wherein the reaction is carried out in a closed apparatus at an autogenous pressure.

8. The process of claim 5 wherein the temperature is from about 20° to 90° C.

9. The process of claim 1 wherein said phenol is 2,4,5-trichlorophenol.

10. The process of claim 9 wherein said 2,4,5-trichlorophenol is present in excess of the stoichiometric requirement.

11. The process of claim 9 wherein said 2,4,5-trichlorophenol is present in from 2 to 10 mole percent in excess of the stoichiometric requirement.

12. The process of claim 9 wherein said 2,4,5-trichlorophenol is present in approximately the stoichiometric requirement.

13. The process of claim 9 wherein said hydrogen fluoride is present in greater mole quantities than said 2,4,5-trichlorophenol by a ratio of at least 5 to 1.

14. The process of claim 9 wherein said hydrogen fluoride is present in greater mole quantities than said 2,4,5-trichlorophenol by a ratio of at least 20 to 1 to about 30 to 1.

15. The process of claim 9 wherein the temperature is from about 20° to 90° C.

16. The process of claim 9 wherein said 2,4,5-trichlorophenol is present in from 2 to 10 mole percent in excess of the stoichiometric requirement, said hydrogen fluoride is present in greater mole quantities than said 2,4,5-trichlorophenol by a ratio of at least 5 to 1 and said temperature is from about 20° to 90° C.

* * * * *